(12) United States Patent
Seyama

(10) Patent No.: US 6,506,838 B1
(45) Date of Patent: Jan. 14, 2003

(54) MODIFIED OXYMETHYLENE POLYMERS

(75) Inventor: Toshiharu Seyama, Kurashiki (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/695,425

(22) Filed: Oct. 25, 2000

(30) Foreign Application Priority Data

Oct. 25, 1999 (JP) .......................................... 11-302380

(51) Int. Cl.$^7$ .............................. C08L 59/00; C08G 2/04
(52) U.S. Cl. ...................... 525/154; 525/398; 525/400; 525/401; 524/736; 524/741; 524/877; 528/230; 528/250; 528/270
(58) Field of Search ................................ 525/400, 398, 525/154, 401; 528/230, 250, 270; 524/736, 741, 877

(56) References Cited

U.S. PATENT DOCUMENTS

| | | | |
|---|---|---|---|
| 3,687,898 A | * | 8/1972 | Ishii |
| 3,879,350 A | * | 4/1975 | Suzuki |
| 4,355,153 A | * | 10/1982 | Radici .......................... 528/243 |
| 4,377,667 A | | 3/1983 | Sakurai et al. |
| 5,942,568 A | * | 8/1999 | Niino .......................... 524/405 |

FOREIGN PATENT DOCUMENTS

| | | |
|---|---|---|
| JP | B224307 | 6/1986 |
| JP | 61-123652 A | 6/1986 |
| JP | B331742 | 8/1987 |
| JP | 3-079618 A | 4/1991 |
| JP | A4323248 | 11/1992 |
| JP | A59363 | 1/1993 |

OTHER PUBLICATIONS

Chemical Abstract XP002207126; Niino, Masahiko; "Higher performance and functions of polymers realized by surface control technology. Giving sliding property."; 1997.

* cited by examiner

Primary Examiner—Patricia A. Short
(74) Attorney, Agent, or Firm—Birch, Stewart, Kolasch & Birch, LLP

(57) ABSTRACT

Modified oxymethylene polymers comprising a linear polymer of oxymethylene repeat units, blocked at one end by at least one terminal group selected from the group consisting of an alkylene oxide as an adduct to alcohol and an alkylene oxide as an adduct to carboxylic acid, the linear polymer excluding the terminal group having a number average molecular weight of 10,000–500,000 and the modified oxymethylene polymer having a molecular weight distribution (Mw/Mn) of not more than 2.5, obtained by anionic polymerization of formaldehyde and the alkylene oxide as an adduct to alcohol and/or carboxylic acid. The present modified oxymethylene polymers can give moldings with improved repeated impact resistance at the welded parts and controlled smell generation, and improved sliding characteristics, wherein the sliding characteristics are further improved upon combination with an olefinic polymer.

16 Claims, No Drawings

MODIFIED OXYMETHYLENE POLYMERS

BACKGROUND OF THE INVENTION

The present invention relates to modified oxymethylene polymers capable of giving moldings with a good repeated impact resistance at the welded parts and a well controlled waxy smell. Furthermore, the present invention relates to modified oxymethylene polymer compositions capable of giving moldings with improved sliding characteristic at the welded parts.

Polyoxymethylene gives moldings with distinguished mechanical strength, fatigue resistance, electrical characteristics, etc. and thus are widely applied to gears, bearings, other mechanical or electrical parts, etc. as an engineering resin. Furthermore, polyoxymethylene moldings are distinguished by their self lubrication properties and thus have many uses utilizing the self lubrication properties.

However, the self lubrication of the polyoxymethylene moldings themselves and sliding characteristics of moldings of polyoxymethylene compositions consisting only of polyoxymethylene and various lubricants are not always satisfactory for recent multifunctional and diversified uses of polyoxymethylene moldings, so that the sliding characteristics of polyoxymethylene moldings need to be improved. Almost all the moldings have welded parts, and it has been keenly desired to stably obtain moldings with distinguished impact resistance and sliding characteristics even at the welded parts.

Well known methods for improving the sliding characteristics of polyoxymethylene moldings include, for example, (1) a method for adding a solid lubricant such as molybdenum disulfide, etc. to polyoxymethylene, (2) a method for adding powder or fibers of polyethylene, polytetrafluoroethylene, etc. to polyoxymethylene, and (3) a method for adding a liquid or solid lubricant such as petroleum-based lubricating oil, synthetic lubricating oil, etc. to polyoxymethylene.

Above all, addition of liquid ethylene. α-olefin copolymer as a lubricant to polyoxymethylene, as disclosed in Japanese Patent No. 2,909,228 is very useful for improving the sliding characteristics of polyoxymethylene moldings, but the liquid ethylene-a-olefin copolymer is essentially less compatible with polyoxymethylene and its good sliding characteristics of the moldings cannot be maintained for a long time. That is, the good sliding characteristics of moldings can be maintained while the lubricant can bleed out onto the surfaces of moldings at the sliding interfaces, but the sliding characteristics of the moldings are largely lowered when the lubricant dissipates from the sliding interfaces of moldings. Furthermore, peeling sometimes occurs on the surface of injection moldings by phase separation due to poor compatibility of the lubricant with polyoxymethylene.

Other methods for improving the sliding characteristics than the above-mentioned are also disclosed in U.S. Pat. No. 4,377,667, JP-A-2-24307, JP-A-3-31742, JP-A-4-323248, JP-A-5-9363, etc., where modified oxymethylene polymers blocked at one end of polyoxymethylene by an alkylene oxide as an adduct residue to alcohol and/or carboxylic acid, are proposed.

However, the modified oxymethylene polymers disclosed in these references fail to give satisfactory repeated impact resistance at the welded parts of moldings, requiring further improvement. The moldings of modified oxymethylene polymers sometimes give off a waxy smell, giving a highly unpleasant feeling.

Said JP-A-5-9363 further discloses a resin composition comprising the modified oxymethylene polymer and an olefin compound, where the sliding characteristics are improved at the unwelded parts of moldings, but the repeated impact resistance is not satisfactory at the welded parts of the molding.

SUMMARY OF THE INVENTION

An object of the present invention is to provide modified oxymethylene polymers capable of giving moldings with a good improved repeated impact resistance at the welded parts and a controlled waxy smell at the same time, and also to polymer compositions capable of giving moldings with improved sliding characteristics at the welded parts.

As a result of extensive studies, the present inventors have found that modified oxymethylene polymers capable of giving moldings with a distinguished repeated impact resistance at welded parts and a controlled waxy smell at the same time by using modified oxymethylene polymers with a specific molecular weight distribution. Moreover, the present inventors have found that said modified oxymethylene polymers can be obtained by making a hindered phenol-based antioxidant present during the polymerization of specific modified oxymethylene polymers.

Furthermore, the present inventors have found that polymer compositions comprising said modified oxymethylene polymers and a specific olefinic polymer can give moldings with distinguished sliding characteristics at the welded parts and particularly a distinguished repeated impact resistance at the welded parts.

That is, the present invention involves the following aspects [1]–[8]:

[1] Modified oxymethylene polymers, which comprise a linear polymer of oxymethylene repeat units, blocked at one end by at least one terminal group selected from the group consisting of an alkylene oxide as an adduct to an alcohol residue, represented by the following general formula (1):

and an alkylene oxide as an adduct to a carboxylic acid residue, represented by the following formula (2):

where in the general formula (1) and (2) $R_1$ and $R_1{}'$ are independently selected from the group consisting of hydrogen, an alkyl group, a substituted alkyl group, an aryl group and a substituted aryl group; $R_2$ is selected from the group consisting of an alkyl group, a substituted alkyl group, an aryl group and a substituted aryl group; m is an integer selected from 2–6 and n is an integer selected from 1–1,000, (a) the linear polymer excluding the terminal group having a number average molecular weight of 10,000–500,000 and (b) the modified oxymethylene polymers having a molecular weight distribution (Mw/Mn) of not more than 2.5.

[2] Modified oxymethylene polymers according to said [1], wherein the modified oxymethylene polymers have a molecular weight distribution of not more than 2.2.

[3] A process for producing modified oxymethylene polymers according to said [1], which comprises anionically polymerizing formaldehyde with at least one compound selected from the group consisting of an alkylene oxide as an adduct to alcohol and an alkylene oxide as an adduct to carboxylic acid as a chain transfer agent (both of which will be hereinafter referred to merely as "alkylene oxide adduct"), wherein 0.001–1 part by weight of a hindered phenol-based antioxidant on the basis of 100 parts by weight of the alkylene oxide adduct is added to the alkylene oxide adduct in advance, and then the formaldehyde and the alkylene oxide adduct are subjected to anionic polymerization.

[4] A process according to said [3], wherein the hindered phenol-based antioxidant has no ester bond and a molecular weight of not more than 400.

[5] Modified oxymethylene polymer compositions, which comprise 100 parts by weight of modified oxymethylene polymers according to said [1] or [2] and 0.3–15 parts by weight of an olefinic polymer of structural units represented by the following general formula (3):

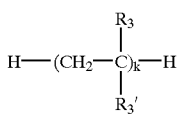

(3)

where $R_3$ and $R_3'$ are independently selected from the group consisting of hydrogen, an alkyl group, a substituted alkyl group, an aryl group, a substituted aryl group and an ether group, and k is an integer selected from 10–500.

[6] Modified oxymethylene polymer compositions according to said [5], wherein the olefinic polymer is an ethylene.α-olefin random copolymer comprising 20–80 mol % of ethylene units, 20–80 mol % of propylene units and 0–10 mol % of other a-olefin units than the propylene units, and the olefinic polymer has a molecular weight distribution (Mw/Mn) of not more than 2.

[7] Modified oxymethylene polymer compositions, which comprise 5–95 wt % of modified oxymethylene polymers according to said [1] or [2] or the modified oxymethylene polymer compositions according to said [5] or [6], and 95–5 wt % of polyoxymethylene homopolymer.

[8] A molding with welded parts, formed from the modified oxymethylene polymers according to said [1] or [2], or the modified oxymethylene polymer compositions according to any one of said [5]–[7].

DETAILED DESCRIPTION OF THE INVENTION

Description will be made in detail below of the present modified oxymethylene polymers and their polymer compositions, where the term "alkyl group" or "aryl group" shall include: all substituted alkyl groups or substituted aryl groups.

The present modified oxymethylene polymers are linear polymers having oxymethylene repeat units, blocked at one end of the polymers by at least one terminal group selected from the group consisting of an alkylene oxide as an adduct residue to alcohol, represented by the following general formula (1):

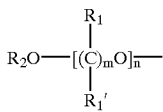

(1)

and an alkylene oxide as an adduct residue to carboxylic acid, represented by the following general formula (2):

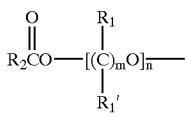

(2)

where $R_1$ and $R_1'$ are independently selected from the group consisting of hydrogen, an alkyl group and an aryl group: $R_2$ is selected from the group consisting of an alkyl group and an aryl group; m is an integer selected from 2–6; and n is an integer selected from 1–1,000.

Structural formulae of the present modified oxymethylene polymers per se can be given as follows:

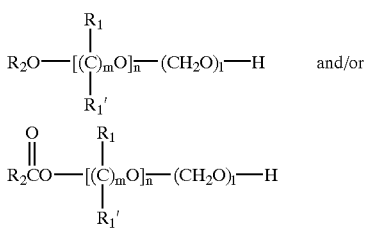

where $R_1$, $R_1'$, $R_2$, m and n have the same meanings as defined above; and l is an integer selected from 334–16666.

Linear polymers having oxymethylene repeat units can be obtained by anionic polymerization of formaldehyde.

The modified oxymethylene polymers represented by the foregoing structural formulae are not stable because of the presence of hydroxyl groups at one end. The hydroxyl groups at one end can be converted to stable groups usually by a well known method such as esterification, etherification, urethanification, etc.

The linear polymers having oxymethylene repeat units excluding the terminal group at one end of the modified oxymethylene polymers have a number average molecular weight ranging from 10,000 to 500,000. The number average molecular weight is found from the weight of the polymers obtained and the number of moles of the chain transfer agent fed into a reaction system. The lower limit of the number average molecular weight depends on the physical properties of moldings of oxymethylene polymer compositions, whereas the upper limit depends on processability of moldings of oxymethylene polymer compositions.

The alkylene oxide as an adduct to alcohol, which can constitute one end of the present modified oxymethylene polymers, is a compound represented by the following structural formula:

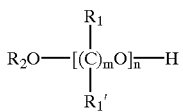

whereas the alkylene oxide as an adduct to carboxylic acid is a compound represented by the following structural formula:

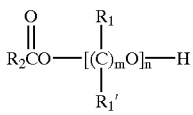

where the alkylene oxide as an adduct to alcohol can be obtained by addition reaction at an alkylene oxide represented by the follow formula:

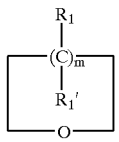

where $R_1$ and $R'_1$ are independently selected from the group consisting of hydrogen, an alkyl group and an aryl group and m is an integer selected from 2–6, to an alcohol represented by the following formula:

$R_2OH$ where $R_2$ is an alkyl group or an aryl group, whereas the alkylene oxide as an adduct to carboxylic acid can be obtained by addition reaction of an alkylene oxide represented by the following formula:

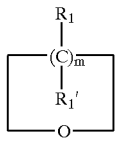

where $R_1$ and $R_1'$ are independently selected from the group consisting of hydrogen, an alkyl group and an aryl group and m is an integer selected from 2–6, to a carboxylic acid represented by the following formula:

$R_2COOH$ where $R_2$ is an alkyl group or an aryl group.

Alcohol includes, for example, methyl alcohol, ethyl alcohol, sec-butyl alcohol, hexyl alcohol, cyclohexyl alcohol, octyl alcohol, decyl alcohol, lauryl alcohol, cetyl alcohol, stearyl alcohol, eicosanol, ceryl alcohol, myricyl alcohol, oleyl alcohol, triterpene alcohol, 3-ethyl-6-undecanol, phenol, p-butyl phenol, p-octyl phenol, p-nonyl phenol, benzyl alcohol, p-butylpentyl alcohol, etc. Parts of these alcohols can be substituted by a halogen compound such as chlorine, fluorine, etc.

Among these alcohols, long-chain aliphatic alcohols of at least 8 carbon atoms and p-alkyl-substituted phenols are preferable from the viewpoint of improving the sliding characteristics of moldings of modified oxymethylene polymer compositions, and more preferable are lauryl alcohol, cetyl alcohol, stearyl alcohol, eicosanol, p-octyl phenol and p-nonyl phenol. These alcohols can be used alone or in a mixture of two or more.

Carboxylic acid includes, for example, acetic acid, propionic acid, caproic acid, 2-ethylhexanoic acid, lauric acid, tridecylic acid, palmitic acid, pentadecylic acid, stearic acid, nonadecanoic acid, arachic acid, behenic acid, oleic acid, linoleic acid, ricinolic acid, phenylacetic acid, cinnamic acid, benzoic acid, o-octylbenzoic acid, α-naphthalenecarboxylic acid, etc. Parts of these carboxylic acids can be substituted by a halogen compound such as chlorine, fluorine, etc.

Among these carboxylic acids, long-chain aliphatic carboxylic acids of at least 8 carbon atoms are preferable from the viewpoint of improving the sliding characteristics of moldings of modified oxymethylene polymer compositions, and more preferable are lauric acid, tridecylic acid, palmitic acid, pentadecylic acid, stearic acid, oleic acid and risinolic acid. These carboxylic acids can be used alone or in mixture of two or more.

Alkylene oxide has 2 to 6 carbon atoms and includes, for example, ethylene oxide, propylene oxide, isobutylene oxide, 1-butene oxide, 2-butene oxide, α-olefin oxide, trimethylethylene oxide, tetramethyl ethylene oxide, butadiene monoxide, epichlorohydrin, styrene oxide, α-methylstyrene oxide, 1,1-diphenylethylene oxide, oxetane, 3,3-bis(chloromethyl)oxetane, tetrahydrofuran, 2-methyltetrahydrofuran, oxepane, ethyleneglycol diglycidyl ether, bisphenol A glycidyl ether, etc. Parts of these alkylene oxides can be substituted by a halogen compound such as chlorine, fluorine, etc., a hydroxyl group, an alkylene ether group, etc.

Or, for example, alcohol can be subjected to addition reaction at first with propylene oxide, and then with ethylene oxide and further with propylene oxide, or to simultaneous addition reaction with propylene oxide and ethylene oxide.

Among these alkylene oxides, ethylene oxide and propylene oxide are particularly preferable from the viewpoint of good affinity toward oxymethylene and easy availability. Propylene oxide is particularly preferable from the viewpoint of a good affinity toward the olefinic polymer. These alkylene oxides can be used alone or in mixture of two or more.

Number (n) of moles of added alkylene oxide per mole of alcohol and/or carboxylic acid must be in a range of 1–1,000. Larger number (n) of moles of added alkylene oxide is preferable for improving the sliding characteristics of moldings of modified oxymethylene polymer composition, whereas smaller number (n) of moles is preferable from the viewpoint of easy preparation and purification of alkylene oxide adduct. In view of these two restrictions, most preferable range of number (n) of moles of added alkylene oxide is between 10 and 250.

Number (n) of moles of added alkylene oxide per mole of alcohol and/or carboxylic acid can be readily determined by quantitative determination of the hydroxyl group at one end of the resulting adduct.

The process for preparing an alkylene oxide adduct is not particularly limited. For example, in a process for ring-opening polymerization of an alkylene oxide with alcohol or carboxylic acid, anionic polymerization using an alkali metal hydroxide, etc. as a catalyst, cationic polymerization using a metal halide, etc. as a catalyst, anionic coordination polymerization using a combination of a metal alkoxide and Lewis acid as a catalyst, or further transetherification between polyalkylene oxide and alcohol or transesterification between polyalkylene oxide and carboxylic acid can be used.

Description will be made below of a process for producing the present modified oxymethylene polymers.

Modified oxymethylene polymers can be produced by anionic polymerization of formaldehyde with said alkylene oxide adduct as a chain transfer agent.

Polymerization temperature is not particularly limited, and usually is between −20° C. and 230° C., preferably between 10° C. and 120° C.

Reaction time is also not particularly limited, and preferably is between 5 seconds and 300 minutes.

It is desirable that the alkylene oxide adduct is purified by distillation, adsorption, drying or other means in advance to the polymerization. The alkylene oxide adducts can be used alone or in mixture of two or more in the polymerization.

In the anionic polymerization of formaldehyde and an alkylene oxide adduct, catalysts known as an anionic polymerization catalyst and an anionic coordination polymerization catalyst can be used. Typical groups of the anionic polymerization catalyst and the anionic coordination polymerization catalyst include, for example, alkali metals such as sodium, potassium, etc.; alkali metal complex compounds such as sodium-naphthalene, potassium-anthracene, etc.; alkali metal hydrides such as sodium hydride, etc.; alkaline earth metal hydrides such as calcium hydride, etc.; alkali metal alkoxides such as sodium methoxide, potassium t-butoxide, etc.; alkali metal carboxylates such as sodium caproate, potassium stearate, etc.; alkaline earth metal carboxylates such as magnesium carproate, calcium stearate, etc.; amines such as n-butylamine, diethylamine, trioctylamine, pyridine, etc.; quaternary ammonium salts such as ammonium stearate, tetrabutylammonium methoxide, dimethyldistearylammonium acetate, etc.; phosphonium salts such as tetramethylphosphonium propionate, trimethylbenzylphosphonium ethoxide, etc.; tetravalent organotin compounds such as tributyl tin chloride, diethyl tin dilaurate, dibutyl tin dimethoxide, etc.; alkyl metals such as n-butyl lithium, ethyl magnesium chloride,etc., and so on.

Anionic polymerization of formaldehyde with an alkylene oxide adduct as raw materials to obtain modified oxymethylene polymers is carried out usually in an organic solvent.

Organic solvent for use in the polymerization includes, for example, aliphatic hydrocarbons such as n-hexane, n-heptane, cyclohexane, etc.; aromatic hydrocarbons such as benzene, toluene, xylene, etc.; halogenated aliphatic hydrocarbons such as methylene chloride, chloroform, trichloroethylene, etc.; halogenated aromatic hydrocarbons such as chlorobenzene, etc., and so on. These organic solvents can be used alone or in mixture of two or more.

It is necessary that the formaldehyde for use in the polymerization is substantially anhydrous and thus is purified by a well known method such as a cooling trap method, a solvent washing method, etc. In case of polymerization of modified oxymethylene polymers, so far well known processes, such as an injection polymerization process, a solution polymerization process, etc. can be used.

The alkylene oxide adduct, which acts as a chain transfer agent, can be used by uniform dissolution or dispersion in an organic solvent. Concentration of the chain transfer agent in the organic solvent can be readily determined by tests, depending on desired molecular weights of modified oxymethylene polymers.

The present modified oxymethylene polymers have a molecular weight distribution (Mw/Mn) of not more than 2.5 (theoretical minimum=1). The molecular weight distribution is preferably not more than 2.2 from the viewpoint of improving the repeated impact resistance of moldings at the welded parts.

Molecular weight distribution (Mw/Mn) of the modified oxymethylene polymers herein referred to is determined in terms of polymethyl methacrylate by a GPC unit, using polymethyl methacrylate as a standard sample and hexafluoroisopropanol as a solvent.

To make the molecular weight distribution of modified oxymethylene polymers not more than 2.5, any method can be used, but a method of making a hindered phenol-based antioxidant present during the polymerization is preferable.

Broadening of the molecular weight distribution of modified oxymethylene polymers is due to partial decomposition of the alkylene oxide adduct during the polymerization and functioning of the resulting decomposition products as the chain transfer agent again to produce modified oxymethylene polymers of lower molecular weight.

The present inventors have now found that slight differences in flowability and compatibility between the modified oxymethylene polymers of lower molecular weight and the modified oxymethylene polymers of higher molecular weight obtained by polymerization without any partial decomposition of the alkylene oxide adduct will lower the repeated impact resistance of moldings at the welded parts.

Hindered phenol-based antioxidant for use in the present invention includes, for example, 2,6-t-10 butyl-p-cresol, 2,6-di-t-butyl-4-ethylphenol, 2,2'-methylene bis-(4-methyl-6-t-butylphenol), 2,2'-methylene bis-(4-ethyl-6-t-butylphenol), 4,4'-butylidiene bis-(3-methyl-6-t-butylphenol), n-octadecyl-3-(3',5'-di-t-butyl-4'-hydroxyphenyl)propionate, n-octadecyl-3-(3'-methyl-5'-t-butyl-4'-hydroxyphenyl)propionate, n-tetradecyl-3-(3',5'-t-butyl-4'-hydroxyphenyl)propionate, 1,6-hexanediol-bis-{3-(3,5-di-t-butyl-4-hydroxyphenyl)propionate}, 1,4-butanediol-bis-{3-(3,5-di-t-butyl-4-hydroxyphenyl) propionate}, triethyleneglycol-bis-{3-(3-t-butyl-5-methyl-4-hydroxyphenyl)propionate}, tetrakis-{methylene-3-(3',5'-di-t-butyl-4'-hydroxyphenyl)propionate}methane, 3,9-bis-[2-{3-(3-t-butyl-4-hydroxy-5-methylphenyl)propionyloxy}-1,1-dimethylethyl], 2,4,8,10-tetraoxaspiro-5,5'-undecane, N,N'-bis-3-(3',5'-di-t-butyl-4'-hydroxyphenyl)propionyl-hexamethylenediamine, N,N'-tetramethylene-bis-3-(3'-methyl-5'-t-butyl-4'-hydroxyphenyl)propionyldiamine, N,N'-bis{3-(3,5-di-t-butyl-4-hydroxyphenyl)propionyl}hydrazine, N-salicyloyl-N'-salicylidene-hydrazine, 3-(N-salicyloyl)-amino-1,2,4-triazole, N,N'-bis-[2-{3-(3,5-di-t-butyl-4-hydroxyphenyl)propionyloxy}ethyl]oxyamide, etc.

It is preferable from the viewpoint of improving the repeated impact resistance of moldings at welded parts and controlling the waxy smell to use a hindered phenol-based antioxidant having a molecular weight of not more than 400 and no ester bond, such as 2,6-t-butyl-p-cresol, 2,6-di-t-butyl-4-ethylphenol, 2,2'-methylene bis-(4-methyl-6-t-butylphenol), 2,2'-methylene bis-(4-ethyl-6- t-butylphenol), 4,4'-butylidene bis-(3-methyl-6-t-butylphenol), etc. More preferable is 2,6-t-butyl-p-cresol.

A method of adding the hindered phenol-based antioxidant to the polymerization system is not particularly limited, but it is preferable from the viewpoint of improving the repeated impact resistance of moldings at the welded parts and controlling the waxy smell to add the hindered phenol-based antioxidant to the alkylene oxide adduct in advance.

The amount of added hindered phenol-based antioxidant is in a range of 0.001–1 part by weight on the basis of 100 parts by weight of the alkylene oxide adduct. Less than 0.001 part by weight makes the effects of the present invention less attainable, whereas more than 1 part by weight has a tendency to lower the polymerization rate and also it becomes undesirably uneconomical.

The modified oxymethylene polymers resulting from the polymerization are separated from the organic solvent, and unstable terminals thereof are blocked by e.g. acetic anhydride and used as they are or as modified oxymethylene polymer compositions upon addition of a lubricant, etc. thereto.

Description will be made in detail below of olefinic polymers.

The olefinic polymer for use in the present invention comprises a structural repeat unit represented by the following general formula (3):

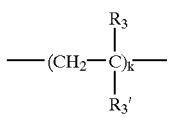

$$-(CH_2-\underset{R_3'}{\overset{R_3}{C}})_k- \qquad (3)$$

where $R_3$ and $R_3'$ are independently selected from the group consisting of hydrogen, an alkyl group, an aryl group and an ether group, and k is an integer selected from 10–500.

The alkyl group includes, for example, ethyl, propyl, butyl, hexyl, octyl, decyl, lauryl, cetyl, stearyl, etc.; the aryl group includes, for example, phenyl, p-butylphenyl, p-octylphenyl, p-nonylphenyl, benzyl, p-butylbenzyl, tolyl, xylyl, etc.; and the ether group includes, for example, ethyl ether, propyl ether, butyl ether, etc.

Olefinic polymers for use in the present invention can be produced by a process disclosed in e.g. JP-B-2-1163, i.e. by polymerization of at least one kind of olefin units in the presence of a Ziegler catalyst, using hydrogen as a molecular weight-controlling agent.

The olefinic polymers for use in the present invention may be compounds made from one kind of olefinic units or compounds made from at least two different kinds of olefin units. For example, olefinic polymers having a block structure or a graft structure made from ethylene units and 1,2-butadiene units are also included in the present olefinic polymers.

From the viewpoint of improving sliding characteristics of moldings of the present modified oxymethylene polymer compositions, the structure of the olefinic polymers is preferably a linear structure rather than a graft structure.

Monomers for the olefinic polymers include, for example, olefinic monomers such as ethylene, propylene, 1-butene, 2-butene, isobutylene, 1-pentene, 2-pentene, 2-methyl-1-butene, 3-methyl-1-butene, 2-methyl-2-butene, 1-hexene, 2,3-dimethyl-2-butene, 1-heptene, 1-octene, 1-nonene, 1-decene, etc.; and diolefinic monomers such as allene, 1,2-butadiene, 1,3-butadiene, 1,3-pentadiene, 1,4-pentadiene, 1,5-hexadiene, cyclopentadiene, etc.

The olefinic polymers for use in the present invention may be compounds obtained by copolymerization of at least two of these olefinic monomers and diolefinic monomers. In case that the olefinic polymers are polymers obtained by polymerization of diolefinic monomers, it is preferable from the viewpoint of improving the heat stability of the present modified oxymethylene polymer compositions to use olefinic polymers whose carbon-carbon unsaturated bonds are made as small as possible by the ordinary hydrogenation method.

Molecular weight distribution (Mw/Mn) of olefinic polymers is desirably not more than 2 (theoretical minimum=1). When the molecular weight distribution exceeds 2, the sliding characteristics and repeated impact resistance of the moldings at the welded parts sometimes deteriorate. Molecular weight distribution of olefinic polymers can be determined in terms of polystyrene by a GPC unit, using monodispersed polystyrene as a standard sample and tetrahydrofuran or o-dichlorobenzene as a solvent.

Average degree of polymerization k of structural units in the olefinic polymers must be between 10 and 500. When the average degree of polymerization k is less than 10, long-term sliding characteristics of moldings of modified oxymethylene polymer compositions are lowered, giving also an adverse effect on moldability and mold contamination. When k is more than 500, the initial sliding characteristics of moldings of the modified oxymethylene polymer compositions are largely lowered. Average degree of polymerization k of structural units is preferably between 15 and 300, more preferably between 20 and 100.

Among these olefinic polymers, it is preferable from the viewpoint of repeated impact resistance and sliding characteristics of moldings at the welded parts to use an ethylene.α-olefin random copolymer comprising 20–80 mol % of ethylene units, 20–80 mol % of propylene units and 0–10 mol % of α-olefin units other than propylene and having a molecular weight distribution (Mw/Mn) of not more than 2. Other α-olefin than propylene herein referred to means impurities, etc. contained in ethylene or propylene as raw materials.

An amount of added olefinic polymers is preferably in a range of 0.3–15 parts by weight on the basis of 100 parts by weight of modified oxymethylene polymers. When the amount is less than 0.3 parts by weight, the effect on improvement of sliding characteristics of moldings of polymer compositions is less, whereas more than 15 parts by weight considerably lowers the moldability of polymer compositions, sometimes giving rise to peeling on the surfaces of moldings. An amount of added olefinic polymers is preferably in a range of 0.5–10 parts by weight, more preferably in a range of 2–8 parts by weight. These olefinic polymers can be used in mixture of two or more.

To give necessary characteristics for the desired uses or purposes, the present modified oxymethylene polymers and polymer compositions comprising the modified oxymethylene polymers and the olefinic polymer can be admixed, within such ranges as not to spoil the purpose of the present invention, with well known additives, e.g. a heat stabilizer such as polyamide, etc.; an antioxidant such as a hindered phenol-based compound, etc.; a light stabilizer such as a hindered amine-based compound, etc.; and ultraviolet ray absorber such as a benzotriazole compound, etc., a nucleating agent such as boron nitride, etc., lubricant such silicone oil, etc.; a mold release agent such as ethylene bis-stearyl amide, etc.; an antistatic agent such as polyethylene glycol, etc.; an inorganic filler such as glass fibers, etc.; and further an organic pigment or an inorganic pigment, and so on.

Particularly, the nucleating agent, when added, can make the non-crystalline region near the surfaces of moldings of the present modified oxymethylene polymers or polymer compositions thinner and thus is very useful for giving distinguished sliding characteristics to the present moldings.

The nucleating agent for use in the present invention includes, for example, an inorganic nucleating agent such as boron nitride, talc, pyrophyllite and an organic nucleating agent such as polyoxymethylene having a three-dimensional cross-linking structure, etc.

The present modified oxymethylene polymers or polymer compositions can be used upon adding a well known polyoxymethylene homopolymer thereto.

The well known polyoxymethylene homopolymer herein referred to means a homopolymer of oxymethylene units, polymerized using an acid anhydride such as acetic anhydride, etc. as a chain transfer agent or a lower alcohol such as methyl alcohol, etc., where the hydroxyl group at one end is stabilized by well known esterification reaction, etc.

Addition of polyoxymethylene homopolymer to the present modified oxymethylene polymers or polymer compositions is very effective for improving the mechanical properties, particularly flexural characteristics, tensile characteristics, of moldings of the present polymers or polymer compositions.

A ratio of polyoxymethylene homopolymer to the present modified oxymethylene polymers or polymer compositions is preferably 5/95–95/5 by weight, more preferably 30/70–70/30 by weight.

A process for producing the present modified oxymethylene polymer compositions is not particularly limited. Generally, the present modified oxymethylene polymer compositions can be prepared by melt-kneading the modified oxymethylene polymers, olefinic polymer and, if required, additives as arbitrary components through an extruder. The extruder may be of an uniaxial type or of a biaxial type. Extruder temperature can be selected usually from a range of 170° C. –240° C. as desired, and is not particularly limited.

A process for molding the present modified oxymethylene polymers or polymer compositions is not particularly limited. That is, moldings can be obtained by any of the molding processes such as injection molding, extrusion molding, compression molding, vacuum molding, blow molding, expansion molding, insert molding, outsert molding, blow injection molding, etc. The moldings can be further subjected to cutting work.

Moldings of the present modified oxymethylene polymers or polymer compositions can be used for structural parts of electrical or electronic equipment, automobile parts and other structural parts and are particularly suitable for structural parts with welded parts such as rollers, gears, pulleys, etc.

As described above, the present modified oxymethylene polymers can give moldings with an improved repeated impact resistance at welded parts and can reduce waxy smell generation by making a hindered phenol-based antioxidant present in the anionic polymerization of specific modified oxymethylene polymers. The present modified oxymethylene polymer compositions comprising a specific modified oxymethylene polymer and a specific olefinic polymer can give moldings with particularly distinguished sliding characteristics and repeated impact resistance at the welded parts. Thus, moldings of the present modified oxymethylene polymers and polymer compositions can be widely as automobile parts, parts of electrical and electronic equipment, etc. and are particularly suitable for mechanical structural parts requiring good sliding characteristics at the welded parts.

DESCRIPTION OF PREFERRED EMBODIMENTS

The present invention will be described in detail below, referring to Examples and Comparative Examples of the present modified oxymethylene polymers, but the present invention shall not be limited to these Examples. "Parts" hereinafter referred to means "parts by weight".

EXAMPLE 1

Thoroughly dehydrated and dried par-formaldehyde was thermally decomposed at 150° C. and passed several times through cooling traps, whereby a formaldehyde gas with 99.9% purity was obtained.

The formaldehyde gas and toluene containing $C_{18}H_{37}O(CH_2CH_2O)_{70}H$ (chain transfer agent, ethylene oxide as an adduct to stearyl alcohol; average number of moles of added ethylene oxide to one mole of stearyl alcohol: 70, which will be hereinafter referred to as "S-70") admixed with 2,6-t-butyl-p-cresol, which will be hereinafter referred to as "BHT", and tetrabutyl-ammonium acetate (catalyst) were continuously co-fed into a reaction system for 3 hours to produce polymers. Polymerization temperature was maintained at 60° C. Feed rate of formaldehyde was set to 110 parts per hour, whereas feed rate of toluene containing tetrabutyl-ammonium acetate and BHT-admixed S-70 was set to 500 parts per hour. Concentration of tetrabutylammonium acetate in toluene was set to $1.0 \times 10^{-4}$ mol/l, whereas concentration of BHT-admixed S-70 was set to $5.0 \times 10^{-3}$ mol/l.

The polymer-containing toluene was continuously discharged from the polymerization system at a discharge rate corresponding to the toluene feed rate, and the polymer was separated therefrom by filtration and thoroughly washed with acetone and vacuum dried, whereby 289 parts of white polymer was obtained. 50 parts of the polymer thus obtained was heated together with 500 parts of acetic anhydride and 0.1 part of potassium acetate at 139° C. for 3 hours, followed by cooling and similar washing and drying, whereby 49 parts of polymer were recovered. By repetition of similar operations, a necessary amount of the polymer for other Examples, etc. were obtained, and then all of the amount of the modified oxymethylene polymer were uniformly mixed.

2 mg of modified oxymethylene polymer thus obtained was dissolved into 2 ml of hexafluoro-isopropanol and molecular weight distribution of the polymer was determined by a GPC unit (Shodex GPC System-51, made by Showa Denko K. K.; a solvent: hexafluoropropanol; temperature: 40° C.; column: Shodex GPC HFIP-805; standard sample: polymethyl methacrylate). It was found that the polymer had a molecular weight distribution (Mw/Mn)= 2.07.

Test pieces were prepared from the modified oxymethylene polymer by the following molding process and the following characteristics of test places were evaluated. The results are shown in Table 1.

Molding process

Test pieces with a welding line at the center of the moldings were molded by an injection molding machine having an injection capacity of 5 ounces (Nestahl injection molding machine, made by Sumitomo Heavy Industries, Ltd.) under the following conditions:
Cylinder temperature: 200° C.
Mold temperature: 80° C.
Injection time: 20 seconds
Cooling time: 10 seconds
Injection pressure: 50 kg/cm² gage
Injection speed: 30%
Test piece size: 13 mm×180 mm×3 mm
Gate: 2 points (tab gate)
Evaluation of waxy smell Smell of test pieces just after molding according to the foregoing process was evaluated by sniffing according to the following criteria:

| ⊚ | ○ | Δ | X |
|---|---|---|---|
| None | faintly | appreciably | considerably |

Peeling Occurrence on Molding Surface

Peeling occurrence (state of a thin film as if separated from the surface) on the surfaces of the test pieces was visually inspected and evaluated according to the following criteria:

|   ○   |   X   |
|-------|-------|
| None  | peeling occurred |

Evaluation of Sliding Characteristics

Coefficient friction (at 1st reciprocation and 30,000th reciprocation) and wear depth (at 30,000th reciprocation) of the test pieces as disk samples were measured by a point contact-reciprocating frictional wear tester (AFT-15 MS, made by ORIENTEC CORP.), using an SUS316 stainless steel ball, 5 mm in diameter, as a pin under the following conditions:

Load on pin: 2 kg/cm$^3$
Reciprocating speed: 30 mm/sec
Temperature: 23° C.
Reciprocation distance: 10 mm
Reciprocation: 30,000 runs The welding line of the test piece was set to a center position of the pin running path and in the direction perpendicular to the pin running path, and sliding characteristics were evaluated according to the following criteria:

| Evaluation criteria   | ⊚    | ○       | Δ      | X    |
|-----------------------|------|---------|--------|------|
| Coefficient of friction | <0.2 | 0.2~0.29 | 0.3~0.5 | >0.5 |
| Wear depth            | <40  | 40~69   | 70~100 | >100 |

(Wear depth unit: μm)

Evaluation of Repeated Impact Resistance

The test pieces were tested by a repeated impact tester (No. 598, made by Toyo Seiki Seisakusho K. K.) under the following conditions:
Falling load: 160 g
Falling height: 10.5 mm
Falling frequency: one falling/sec.

Number of failings up to rupture of the welding line was counted.

EXAMPLE 2

100 parts of the modified oxymethylene polymer obtained in Example 1 was mixed with 0.25 parts of 2,2'-methylene-bis -(4-methyl-6-t-butylphenol), 0.5 parts of a terpolymer of polycaprolactam/polyhex-methylene adipamide/ polyhexamethylene sebacamide, 0.01 part of boron nitride and 3 parts of H—(CH$_2$CH$_2$)$_{100}$-H having a molecular weight distribution (Mw/Mn) of 1.7 (Mw/Mn was measured according to the same method as given in the following Examples 11–26) as an olefinic polymer, which will be hereinafter referred to "PO-1", in a Henschel mixer, and the mixture was granulated by a biaxial extruder (L/D ratio=32) with a vent opening, 30 mm in diameter, at a cylinder temperature of 200° C., whereby a modified oxymethylene polymer composition was obtained. Then, test pieces were prepared from the modified oxymethylene polymer composition by the same molding process as in Example 1. Smell, peeling on the surface, sliding characteristics and repeated impact resistance of test pieces were evaluated in the same manner as in Example 1. The evaluation results are shown in Table 1.

Comparative Example 1

Modified oxymethylene polymer was prepared in the same manner as in Example 1 except that S-70 not admixed with BHT was used in place of the BHT-admixed S-70 of Example 1.

Comparative Example 2

Modified oxymethylene polymer composition was prepared in the same manner as in Example 2 except that the modified oxymethylene polymer of Comparative Example 1 was used in place of the modified oxymethylene polymer of Example 2.

Comparative Examples 3 and 4

The so called "polyoxymethylene homopolymers" were prepared in the same manner as in Example 1 except that acetic anhydride was used in place of S-70 as a chain transfer agent with addition of BHT thereto (Comparative Example 3) or without addition of BHT thereto (Comparative Example 4), and polymer compositions were prepared in the same manner as in Example 2.

Results of evaluations of test pieces prepared from Comparative Examples 1 to 4 are shown in Table 1.

TABLE 1

|                              | Ex. 1 | Ex. 2 | Comp. Ex. 1 | Comp. Ex. 2 | Comp. Ex. 3 | Comp. Ex. 4 |
|------------------------------|-------|-------|-------------|-------------|-------------|-------------|
| Chain transfer agent         | S-70  | S-70  | S-70        | S-70        | acetic anhydride | acetic anhydride |
| Antioxidant                  | BHT   | BHT   | none        | none        | BHT         | none        |
| Amount added (wt %)          | 0.1   | 0.1   |             |             | 0.1         |             |
| Polymer Mw/Mn                | 2.07  | 2.07  | 2.89        | 2.89        | 2.11        | 2.07        |
| Olefinic polymer             | none  | PO-1  | none        | PO-1        | PO-1        | PO-1        |
| Amount added (parts by weight) |     | 3     |             | 3           | 3           | 3           |
| Mw/Mn                        |       | 1.7   |             | 1.7         | 1.7         | 1.7         |
| Waxy smell                   | ⊚     | ⊚     | X           | X           | ⊚           | ⊚           |
| Coefficient of friction      |       |       |             |             |             |             |
| 1st reciprocation            | Δ     | ○     | Δ           | ○           | ○           | ○           |
| 30,000th reciprocation       | Δ     | ○     | Δ           | ○           | X           | X           |
| Wear depth                   | Δ     | ○     | Δ           | ○           | X           | X           |
| Repeated impact (number of falling) | 10900 | 10800 | 6200 | 4200 | 1500 | 1200 |
| Peeling occurrence           | ○     | ○     | ○           | ○           | X           | X           |

In contrast to Example 1, Comparative Example 1 showed a broader Mw/Mn, a waxy smell was generated and the repeated impact resistance was lowered. Comparative Example 2, where olefinic polymer, etc. were added to the modified oxymethylene polymer of Comparative Example 1, showed that the repeated impact resistance was further lowered, as compared with Comparative Example 1.

This means that only a combination of specific modified oxymethylene polymer obtained by making a hindered phenol-based antioxidant during the polymerization and an olefinic polymer can further improve the sliding characteristics of the moldings at welded parts, while maintaining the effect of improving the repeated impact resistance at the welded parts and controlling the waxy smell of the moldings.

Comparison of Comparative Example 3 with Comparative Example 4, both using acetic anhydride as a chain transfer agent revealed that no numerical value of Mw/Mn was changed, irrespective of the presence or absence of BHT. This means that depolymerization of the oxymethylene unit did not take place but rather partial decomposition of alkylene oxide adduct (chain transfer agent) took place.

EXAMPLES 3–10

Comparative Example 5

Modified oxymethylene polymer compositions were prepared in the same manner as in Example 2, except that different hindered phenol-based antioxidants were used as given below. Test pieces were prepared from the resulting modified oxymethylene polymer compositions by the same molding process as in Example 1 and smell, peeling on the surface, sliding characteristics and repeated impact strength of test pieces were evaluated in the same manner as in Example 1. Results of evaluation are shown in Table 2.

Hindered phenol-based oxidants used are as follows:
A0-1: 2,6-di-t-butyl-4-ethylphenol
A0-2: 2,2'-methylene bis-(4-methyl-6-t-butylphenol)
A0-3: 2,2'-methylene bis-(4-ethyl-6-t-butylphenol)
A0-4: 4,4'-butylidene bis-(3-methyl-6-t-butylphenol)
A0-5: tetrakis{methylene-3-(3',5'-di-t-butyl-4'-hydroxyphenyl) propionate}methane Moldings of modified oxymethylene polymer compositions of Examples 3 to 6 are particularly distinguished in view of the improved repeated impact resistance and smell control. This means that hindered phenol-based antioxidants having a molecular weight of not more than 400 without any ester bond are particularly effective for improving these characteristics. Above all, it was found that the modified oxymethylene polymer composition of Example 2 using BHT as a hindered phenol-based antioxidant gave moldings with the most distinguished repeated impact resistance.

EXAMPLE 11–26

Modified oxymethylene polymer compositions were prepared in the same manner as in Example 2 except that different olefinic polymers were used as given below. Then, test pieces were prepared from the resulting modified oxymethylene polymer compositions by the same molding process as in Example 1, and smell, peeling on the surface, sliding characteristics and repeated impact resistance of moldings were evaluated in the same manner as in Example 1. Results of evaluation are shown in Table 3.

Olefinic polymers used are as follows:
PO-2: $H-[CH_2CH(CH_3)]_{14}-H$
Mw/Mn=1.6
PO-3: $H-[CH_2CH(CH_3)]_{100}-H$
Mw/Mn=1.7
PO-4: $H-[CH_2CH(CH_3)]_{480}-H$
Mw/Mn=1.9
PO-5: $-H-\{[CH_2CH_2]-[CH_2CH(CH_3)]\}_{10}-H$
Mw/Mn =1.7
PO-6: $H-\{[CH_2CH_2]-[CH_2CH(CH_3)]\}_{20}-H$
Mw/Mn =1.8
PO-7: $H-\{[CH_2CH_2]-[CH_2CH(CH_3)]\}_{50}-H$
Mw/Mn =1.7
PO-8: $H-\{[CH_2CH_2]-[CH_2CH(CH_3)]_4\}_{20}-H$
Mw/Mn =1.9
PO-9: $H-\{[CH_2CH_2]-[CH_2CH(CH_3)]_4\}_{20}-H$
Mw/Mn =2.9

Structural formulae showing the foregoing PO-5 to PO-9 are model-wise given in ratio by moles of $[CH_2CH_2]$ units to $[CH_2CH(CH_3)]$ units in the olefinic polymers, and do not mean block-wise presence of $[CH_2CH_2]$ units and $[CH_2CH(CH_3)]$ units in the olefinic polymers. Actually in PO-5 to PO-9, $[CH_2CH_2]$ units and $[CH_2CH(CH_3)]$ units are present at random.

Molecular weight distribution (Mw/Mn) of olefinic polymers were determined as follows:

When the olefinic polymer was soluble in tetrahydrofuran, which will be hereinafter referred to as "THF" at room temperature, 2 mg of the olefinic polymer was dissolved in 2 ml of THF, and subjected to Mw/Mn determination by a GPC unit (solvent: THF, temperature: 40° C., column: Shodex GPC AT-80M/S, standard sample: polystyrene).

When the olefinic polymer was insoluble in THF at room temperature, 2 mg of the olefinic polymer was dissolved in 2 ml of orthodichlorobenzene at 130° C., and subjected to Mw/Mn determination by a GPC unit (solvent: orthodichlorobenzene, temperature: 140° C., column: Shodex GPC AT-80M/S, standard sample: polystyrene).

In Examples 23 to 26, the following materials were used in place of the olefinic polymers:

TABLE 2

| | Ex. 3 | Ex. 4 | Ex. 5 | Ex. 6 | Ex. 7 | Ex. 8 | Ex. 9 | Ex. 10 | Comp. Ex. 5 |
|---|---|---|---|---|---|---|---|---|---|
| Chain transfer agent | S-70 | S-70 | S-70 | S-70 | S-70 | S-70 | S-70 | S-70 | S-70 |
| Antioxidant | A0-1 | A0-2 | A0-3 | A0-4 | A0-5 | A0-1 | A0-1 | A0-1 | A0-1 |
| Amount added (wt %) | 0.1 | 0.1 | 0.1 | 0.1 | 0.1 | 0.001 | 0.01 | 0.99 | 0.0001 |
| Polymer Mw/Mn | 1.89 | 2.09 | 2.14 | 1.97 | 2.19 | 2.18 | 2.10 | 1.97 | 2.67 |
| Olefinic polymer | PO-1 | PO-1 | PO-1 | PO-1 | PO-1 | PO-1 | PO-1 | PO-1 | PO-1 |
| Amount added (parts by weight) | 3 | 3 | 3 | 3 | 3 | 3 | 3 | 3 | 3 |
| Mw/Mn | 1.7 | 1.7 | 1.7 | 1.7 | 1.7 | 1.7 | 1.7 | 1.7 | 1.7 |
| Waxy smell | ⊚ | ⊚ | ⊚ | ⊚ | ○ | ⊚ | ⊚ | ⊚ | Δ |
| Coefficient of friction | | | | | | | | | |
| 1st reciprocation | ○ | ○ | ○ | ○ | ○ | ○ | ○ | ○ | ○ |
| 30,000th reciprocation | ○ | ○ | ○ | ○ | ○ | ○ | ○ | ○ | ○ |
| Wear depth | ○ | ○ | ○ | ○ | ○ | ○ | ○ | ○ | ○ |
| Repeated impact (number of falling) | 8800 | 8900 | 8500 | 8400 | 7000 | 7200 | 8400 | 8900 | 5600 |
| Peeling occurrence | ○ | ○ | ○ | ○ | ○ | ○ | ○ | ○ | ○ |

Silicone oil: polydimethylsiloxane with a viscosity of 1,000 mm²/s at 25° C.
MoS2: molybdenum disulfide
St-Ca: calcium stearate
PTFE: polytetrafluoroethylene (average particle size: 1.2 μm)

chain transfer agents were used in place of the ethylene oxide as an adduct to stearyl alcohol (S-70) of Example 2. Then, test pieces were prepared from the resulting modified oxymethylene polymer compositions in the same molding process as in Example 1, and smell, peeling on the surface, sliding characteristics and repeated impact resistance of the

TABLE 3

|  | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| Chain transfer agent | S-70 | S-70 | S-70 | S-70 | S-70 | S-70 | S-70 | S-70 | S-70 | S-70 |
| Antioxidant | BRT | BHT | BHT | BHT | BHT | BHT | BHT | BHT | BHT | BHT |
| Amount added (wt %) | 0.1 | 0.1 | 0.1 | 0.1 | 0.1 | 0.1 | 0.1 | 0.1 | 0.1 | 0.1 |
| Polymer Mw/Mn) | 2.07 | 2.07 | 2.07 | 2.07 | 2.07 | 2.07 | 2.07 | 2.07 | 2.07 | 2.07 |
| Olefinic polymer | PO-2 | PO-3 | PO-4 | PO-5 | PO-6 | PO-7 | PO-8 | PO-9 | PO-7 | PO-7 |
| Amount added (parts by weight) | 3 | 3 | 3 | 3 | 3 | 3 | 3 | 3 | 0.1 | 0.3 |
| Mw/Mn | 1.6 | 1.7 | 1.9 | 1.9 | 1.7 | 1.7 | 1.8 | 2.9 | 1.7 | 1.7 |
| Waxy smell | ⊚ | ⊚ | ⊚ | ⊚ | ⊚ | ⊚ | ⊚ | ⊚ | ⊚ | ⊚ |
| Coefficient of friction |  |  |  |  |  |  |  |  |  |  |
| 1st reciprocation | ○ | ○ | ○ | ○ | ⊚ | ⊚ | ⊚ | ○ | Δ | ○ |
| 30,000th reciprocation | ○ | ○ | ○ | ○ | ⊚ | ⊚ | ⊚ | ○ | X | ○ |
| Wear depth | ○ | ⊚ | ○ | ○ | ⊚ | ⊚ | ⊚ | ○ | X | ⊚ |
| Repeated impact resistance (number of falling) | 9900 | 10800 | 10000 | 9800 | 14300 | 17900 | 15700 | 10100 | 12100 | 19200 |
| Peeling occurrence | ○ | ○ | ○ | ○ | ○ | ○ | ○ | ○ | ○ | ○ |

|  | Ex. 21 | Ex. 22 | Ex. 23 | Ex. 24 | Ex. 25 | Ex. 26 |
|---|---|---|---|---|---|---|
| Chain transfer agent | S-70 | S-70 | S-5 | S-5 | S-5 | S-5 |
| Antioxidant | BHT | BHT | BHT | BHT | BHT | BHT |
| Amount added (wt %) | 0.1 | 0.1 | 0.1 | 0.1 | 0.1 | 0.1 |
| Polymer Mw/Mn) | 2.07 | 2.07 | 1.88 | 1.88 | 1.88 | 1.88 |
| Olefinic polymer | PO-7 | PO-7 | (silicon oil) | (MoS2) | (St-Ca) | (PTFE) |
| Amount added (parts by weight) | 10 | 17 | 3 | 3 | 3 | 3 |
| Mw/Mn | 1.7 | 1.7 |  |  |  |  |
| Waxy smell | ⊚ | ⊚ | ⊚ | ⊚ | ⊚ | ⊚ |
| Coefficient of friction |  |  |  |  |  |  |
| 1st reciprocation | ⊚ | ⊚ | ⊚ | ○ | Δ | ○ |
| 30,000th reciprocation | ⊚ | ⊚ | X | ○ | X | X |
| Wear depth | ⊚ | ○ | Δ | X | Δ | X |
| Repeated impact resistance (number of falling) | 14500 | 7000 | 7800 | 8200 | 8300 | 8100 |
| Peeling occurrence | ○ | X | X | ○ | ○ | ○ |

It was found that moldings of modified oxymethylene polymer compositions of Examples 15 to 17 had particularly distinguished sliding characteristics and repeated impact resistance at the welded parts. This means that when olefinic polymers are ethylene-α-olefin copolymers comprising 20–80 mol.% of ethylene units, 20–80 mol.% of propylene units and 0–10 mol.% of α-olefin units other than propylene, the characteristics of moldings can be particularly distinguished. Examples 27–31 and Comparative Example 6

Modified oxymethylene polymer compositions were prepared in the same manner as in Example 2, except that other moldings were evaluated in the same manner as in Example 1. Results of evaluation are shown in Table 4.

Chain transfer agents used are as follows:
S-1: $C_{18}H_{37}$—[$CH_2CH(CH_3)$—O]$_{40}$—H
S-2: p-$C_8H_7$—($C_6H_4$)—O—($CH_2CH_2$—O)$_{40}$—H (ethylene oxide as an adduct to p-octyl phenol)
S-3: $C_{17}H_{35}$—COO—[$CH_2CH(CH_3)$—O]$_{40}$—H
S-4: $C_{18}H_{37}$—O—($CH_2CH_2$—O)$_3$—H
S-5: $C_{18}H_{37}$—O—($CH_2CH_2$—O)$_{980}$—H
S-6: $C_{18}H_{37}$—OH

TABLE 4

|  | Ex. 27 | Ex. 28 | Ex. 29 | Ex. 30 | Ex. 31 | Comp. Ex. 6 |
|---|---|---|---|---|---|---|
| Chain transfer agent | S-1 | S-2 | S-3 | S-4 | S-5 | S-6 |
| Antioxidant | BHT | BRT | BHT | BHT | BHT | BHT |
| Amount added (wt %) | 0.1 | 0.1 | 0.1 | 0.1 | 0.1 | 0.1 |
| Polymer Mw/Mn | 1.93 | 1.90 | 2.00 | 1.91 | 1.88 | 2.13 |
| Olefinic polymer | PO-7 | PO-7 | PO-7 | PO-7 | PO-7 | PO-7 |
| Amount added (parts by weight) | 3 | 3 | 3 | 3 | 3 | 3 |
| Mw/Mn | 1.7 | 1.7 | 1.7 | 1.7 | 1.7 | 1.7 |
| Waxy smell | ⊚ | ⊚ | ⊚ | ⊚ | ⊚ | ⊚ |
| Coefficient of friction |  |  |  |  |  |  |
| 1st reciprocation | ⊚ | ⊚ | ⊚ | ○ | ⊚ | ○ |
| 30,000th reciprocation | ⊚ | ⊚ | ⊚ | ○ | ⊚ | X |

TABLE 4-continued

|  | Ex. 27 | Ex. 28 | Ex. 29 | Ex. 30 | Ex. 31 | Comp. Ex. 6 |
|---|---|---|---|---|---|---|
| Wear depth | ◎ | ◎ | ◎ | ○ | ○ | X |
| Repeated impact (number of falling) | 16800 | 17600 | 17100 | 9800 | 11900 | 1300 |
| Peeling occurrence | ○ | ○ | ○ | ○ | ○ | X |

EXAMPLES 32–35

Modified oxymethylene polymer obtained in Example 1 was mixed with polyoxymethylene homopolymer [Tenac® 5010 made by Asahi Kasei Kogyo K. K.] in formulations given in Table 5 and granulated. Test pieces were prepared from the resulting compositions in the same molding process as in Example 1, and physical properties of test pieces were evaluated. That is, sliding characteristics and repeated impact resistance of moldings were determined in the same manner as in Example 1, whereas preparation of test pieces for evaluation of flexural characteristics and tensile characteristics and testing of the test pieces were carried out according to ASTM-D790 and ASTM-D638. It was found that the addition of polyoxymethylene homopolymer to the modified oxymethylene polymer could improve the repeated impact resistance, flexural characteristics and tensile characteristics of moldings, while maintaining equivalent sliding characteristics.

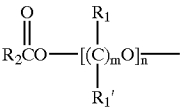
(2)

where in the formulae (1) and (2) $R_1$ and $R_1'$ are independently selected from the group consisting of hydrogen, an alkyl group, a substituted alkyl group, an aryl group and a substituted aryl group; $R_2$ is selected from the group of an alkyl group, a substituted alkyl group, an aryl group and a substituted aryl group; m is an integer selected from 2–6 and n is an integer selected from 1–1,000, (a) the linear polymer excluding the terminal group having a number average molecular weight of 10,000–500,000 and (b) the modified oxymethylene polymers having a molecular weight distribution (Mw/Mn) of not more than 2.5.

TABLE 5

|  | Ex. 2 | Ex. 32 | Ex. 33 | Ex. 34 | Ex. 35 |
|---|---|---|---|---|---|
| Modified oxymethylene polymer of Ex. 1 | 100 wt % | 95 wt % | 70 wt % | 50 wt % | 5 wt % |
| Polyoxymethylene homopolymer | 0 wt % | 5 wt % | 30 wt % | 50 wt % | 95 wt % |
| Olefinic polymer | PO-1 | PO-1 | PO-1 | PO-1 | PO-1 |
| Amount added (parts by weight) | 3 | 3 | 3 | 3 | 3 |
| Mw/Mn | 1.7 | 1.7 | 1.7 | 1.7 | 1.7 |
| Coefficient of friction |  |  |  |  |  |
| 1st reciprocation | ○ | ○ | ○ | ○ | ○ |
| 30,000th reciprocation | ○ | ○ | ○ | ○ | ○ |
| Wear depth | ○ | ○ | ○ | ○ | ○ |
| Repeated impact resistance (number of falling) | 10800 | 13800 | 19600 | 19300 | 14300 |
| Flexural strength (GPa) | 89 | 95 | 98 | 100 | 103 |
| Flexural modulus (GPa) | 2650 | 2850 | 2930 | 2960 | 2980 |
| Tensile strength (GPa) | 58 | 60 | 68 | 69 | 71 |
| Tensile elongation (%) | 31 | 33 | 40 | 45 | 45 |

What is claimed is:

1. Modified oxymethylene polymers, which comprise a linear polymer of oxymethylene repeat units, blocked at one end by at least one terminating group selected from the group consisting of an alkylene oxide as an adduct to an alcohol residue, represented by the following formula (1):

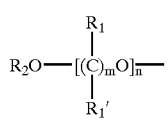
(1)

and an alkylene oxide as an adduct to a carboxylic acid residue, represented by the following formula (2):

2. Modified oxymethylene polymers according to claim 1, wherein the modified oxymethylene polymers have a molecular weight distribution of not more than 2.2.

3. A process for producing modified oxymethylene polymers according to claim 1, which comprises anionically polymerizing formaldehyde with at least one compound selected from the group consisting of an alkylene oxide as an adduct to alcohol and an alkylene oxide as an adduct to carboxylic acid as a chain transfer agent, wherein 0.001–1 part by weight of a hindered phenol-based antioxidant on the basis of 100 parts by weight of the compound is added to the compound in advance, and then the formaldehyde and the compound are subjected to anionic polymerization.

4. A process according to claim 3, wherein the hindered phenol-based antioxidant has no ester bond and a molecular weight of not more than 400.

5. A process according to claim 3, wherein the alkylene oxide as an adduct to alcohol is prepared by an addition reaction between an alkylene oxide represented by the following formula:

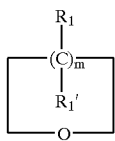

where $R_1$ and $R'_1$ are independently selected from the group consisting of hydrogen, an alkyl group and an aryl group and m is an integer selected from 2–6, and an alcohol represented by the following formula:

$$R_2OH$$

where $R_2$ is an alkyl group or an aryl group.

6. A process according to claim 5, wherein the alcohol is selected from the group consisting of methyl alcohol, ethyl alcohol, sec-butyl alcohol, hexyl alcohol, cyclohexyl alcohol, octyl alcohol, decyl alcohol, lauryl alcohol, cetyl alcohol, stearyl alcohol, eicosanol, ceryl alcohol, myricyl alcohol, oleyl alcohol, triterpene alcohol, 3-ethyl-6-undecanol, phenol, p-butyl phenol, p-octyl phenol, p-nonyl phenol, benzyl alcohol, and p-butylpentyl alcohol; wherein the alcohol is optionally substituted by a halogen compound.

7. A process according to claim 3, wherein the alkylene oxide adduct to carboxylic acid is prepared using a carboxylic acid selected from the group consisting of acetic acid, propionic acid, caproic acid, 2-ethylhexanoic acid, lauric acid, tridecylic acid, palmitic acid, pentadecylic acid, stearic acid, nonadecanoic acid, arachic acid, behenic acid, oleic acid, linoleic acid, ricinolic acid, phenylacetic acid, cinnamic acid, benzoic acid, o-octylbenzoic acid, and α-naphthalene-carboxylic acid; wherein the carboxylic acid is optionally substituted by a halogen compound.

8. A process according to claim 3, wherein the alkylene oxide has 2 to 6 carbon atoms.

9. A process according to claim 3, wherein the anionic polymerization is performed with a catalyst selected from the group consisting of alkali metals, alkali metal complex compounds, alkali metal hydrides, alkylene earth metal hydrides, alkali metal alkoxides, alkali metal carboxylates alkylene earth metal carboxylates amines, quaternary ammonium salts, phosphonium salts, tetravalent organotin and alkyl metals.

10. A process according to claim 3, wherein the hindered phenol-based antioxidant is selected from the group consisting of 2,6-t-butyl-p-cresol, 2,6-di-t-butyl-4-ethylphenol, 2,2'-methylene bis-(4-methyl-6-t-butylphenol), 2,2'-methylene bis-(4-ethyl-6-t-butylphenol), 4,4'-butylidiene bis-(3-methyl-6-t-butylphenol), n-octadecyl-3-(3',5'-di-t-butyl-4'-hydroxyphenyl)propionate, n-octadecyl-3-(3'-methyl-5'-t-butyl-4'-hydroxyphenyl)propionate, n-tetradecyl-3-(3',5'-t-butyl-4'-hydroxyphenyl)propionate, 1,6-hexanediol-bis-{3-(3,5-di-t-butyl-4-hydroxyphenyl) propionate}, 1,4-butanediol-bis-{3-(3,5-di-t-butyl-4-hydroxyphenyl)propionate}, triethyleneglycol-bis-{3-(3-t-butyl-5-methyl-4-hydroxyphenyl)propionate}, tetrakis-{methylene-3-(3',5'-di-t-butyl-4'-hydroxyphenyl) propionate}methane, 3,9-bis[2-{3-(3-t-butyl-4-hydroxy-5-methylphenyl)propionyloxy}-1,1-dimethylethyl], 2,4,8,10-tetraoxaspiro-5,5'-undecane, N,N'-bis-3-(3',5'-di-t-butyl-4'-hydroxyphenyl)propionyl-hexamethylenediamine, N,N'-tetramethylene-bis-3-(3'-methyl-5'-t-butyl-4'-hydroxyphenyl)propionyldiamine, N,N'-bis {3-(3,5-di-t-butyl-4-hydroxyphenyl)propionyl}hydrazine, N-salicyloyl-N'-salicylidene-hydrazine, 3-(N-salicyloyl)-amino-1,2,4-triazole, and N,N'-bis-[2-{3-(3,5-di-t-butyl-4-hydroxyphenyl)propionyloxy}ethyl]oxyamide.

11. Modified oxymethylene polymers according to claim 1, wherein (n) is 10 to 250.

12. Modified oxymethylene polymers according to claim 1, wherein (n) is an integer selected from 10–1,000 in the formula (1) and (2).

13. Modified oxymethylene polymer compositions, which comprise 100 parts by weight of modified oxymethylene polymers according to claim 1 or 2 and 0.3–15 parts by weight of an olefinic polymer of structural units represented by the following general formula (3):

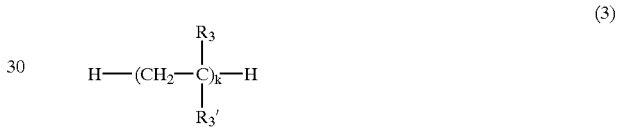

where $R_3$ and $R'_3$ are independently selected from the group consisting of hydrogen, an alkyl group, a substituted alkyl group, an aryl group, a substituted aryl group and an ether group, and k is an integer selected from 10–500.

14. Modified oxymethylene polymer compositions according to claim 13, wherein the olefinic polymer is an ethylene. α-olefin random copolymer comprising 20–80 mol % of ethylene units, 20–80 mol % of propylene units and 0–10 mol % of α-olefin units other than the propylene units, and the olefinic polymer has a molecular weight distribution (Mw/Mn) of not more than 2.

15. Modified oxymethylene polymer compositions, which comprise 5–95 wt. % of modified oxymethylene polymers according to claim 1 or 2 and 95–5 wt. % of polyoxymethylene homopolymer.

16. A molding with welded parts, formed from modified oxymethylene polymers according to claim 1.

* * * * *